US012407747B2

(12) United States Patent
Sodagar

(10) Patent No.: US 12,407,747 B2
(45) Date of Patent: Sep. 2, 2025

(54) TAILORED SCHEDULING OF NBMP MEDIA WORKFLOWS BASED ON THE PLATFORM CAPABILITIES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/128,843

(22) Filed: Mar. 30, 2023

(65) Prior Publication Data

US 2023/0336606 A1 Oct. 19, 2023

Related U.S. Application Data

(60) Provisional application No. 63/332,611, filed on Apr. 19, 2022, provisional application No. 63/332,608, filed on Apr. 19, 2022.

(51) Int. Cl.
*H04L 65/75* (2022.01)
*H04L 65/70* (2022.01)

(52) U.S. Cl.
CPC ............ *H04L 65/765* (2022.05); *H04L 65/70* (2022.05)

(58) Field of Classification Search
CPC ... H04L 65/765; H04L 65/07; H04L 12/2876; H04L 67/61; H04L 67/141; H04L 41/0894; G06F 9/5055; G06F 9/5005
USPC ........................................................ 709/231
See application file for complete search history.

(56) References Cited

U.S. PATENT DOCUMENTS

| 2013/0007753 A1* | 1/2013 | Jain ....................... G06F 9/4881 718/103 |
| 2020/0296431 A1 | 9/2020 | Sodagar |
| 2021/0096922 A1* | 4/2021 | Sodagar ................. H04L 67/10 |

OTHER PUBLICATIONS

"Revised text of ISO/IEC FDIS 23090-8 2nd edition Network-based Media Processing", ISO/IEC JTC 1/SC 29/WG 03 N0498, Feb. 5, 2022, 284 pgs.
International Search Report dated Jun. 26, 2023 in Application No. PCT/US23/17290.
Written Opinion of the International Searching Authority dated Jun. 26, 2023 in Application No. PCT/US23/17290.
"Information technology-Coded-representation of immersive media—Part 8: Network based media processing" International Standard; ISO/IEC 23090-8, 2020; First edition; pp. 5-17; 116-118 (18 pages total).

* cited by examiner

*Primary Examiner* — Tan Doan
(74) *Attorney, Agent, or Firm* — Sughrue Mion, PLLC

(57) ABSTRACT

There is included a method and apparatus comprising computer code configured to cause a processor or processors to obtain a request from a network based media processing (NBMP) client to an NBMP workflow manager, transmit a response from the workflow manager to the client, obtain a second request from the client to the workflow manager, control the NBMP workflow manager to set at least one parameter of a NBMP workflow based on the second request, and to control the media content to be processed using the NBMP workflow, the at least one parameter being of any of a scaling scheme and a scheduling scheme, and the requests regard capabilities requested from the workflow manager.

20 Claims, 11 Drawing Sheets

TAILORED SCHEDULING OF NBMP MEDIA WORKFLOWS BASED ON THE PLATFORM CAPABILITIES

CROSS REFERENCE TO RELATED APPLICATION

The present application claims priority to provisional applications U.S. 63/332,608, filed on Apr. 19, 2022, and U.S. 63/332,611, also filed on Apr. 19, 2022, the contents of which are hereby incorporated by reference, in their entirety, into the present application.

BACKGROUND

1. Field

The present disclosure is directed to providing a call flow for scheduling and scaling workflows using network based media processing (NBMP) descriptors based on the platform capabilities.

2. Description of Related Art

Even if network and cloud platforms are used to run various applications and a network based media processing (NBMP) standard defines a set of tools for the independent processing of media segments thereby, due to technical deficiencies, no call flows are provided in the NBMP specification for any of scheduling and scaling the workflows.

SUMMARY

To address one or more different technical problems, this disclosure provides technical solutions to reduce network overhead and server computational overheads while delivering an option to apply various operations to the resolved element such that in using these operations some of practicality and technical signaling features thereof may be improved.

There is included a method and apparatus comprising memory configured to store computer program code and a processor or processors configured to access the computer program code and operate as instructed by the computer program code. The computer program code comprises first obtaining code configured to cause the at least one processor to obtain a first request from a network based media processing (NBMP) client to an NBMP workflow manager, transmitting code configured to cause the at least one processor to transmit a first response from the NBMP workflow manager to the NBMP client, the first response being in response to and based on the first request, second obtaining code configured to cause the at least one processor to obtain a second request from the NBMP client to the NBMP workflow manager, the second request being in response to and based on the first response, first controlling code configured to cause the at least one processor to control the NBMP workflow manager to set at least one parameter of a NBMP workflow in response to and based on the second request, the at least one parameter being of any of a scaling scheme and a scheduling scheme, and second controlling code configured to cause the at least one processor to control the media content to be processed using the NBMP workflow, the first request and the second request each request capabilities from the NBMP workflow manager, the capabilities being one of scheduling capabilities and scaling capabilities other than of functions of tasks of processing the NBMP workflow.

According to exemplary embodiments, the first request instructs the NBMP workflow manager to respond to the NBMP client with the capabilities from the NBMP workflow manager, the second request instructs the NBMP workflow manager to set the at least one parameter of the NBMP workflow, the parameter being of the capabilities from the NBMP workflow manager and other than of functions of tasks of processing the NBMP workflow, and the NBMP workflow is, at least at a time of the first request, a running workflow According to exemplary embodiments, the first request requests scheduling capabilities, as the capabilities, of the NBMP workflow manager, and the second request instructs the NBMP workflow manager to set the at least one parameter based on the scheduling capabilities.

According to exemplary embodiments, there is further, of the computer program code, second transmitting code configured to cause the at least one processor to transmit a second response from the NBMP workflow manager to the NBMP client, and the second request instructs the NBMP workflow manager to set a specific schedule for the running workflow, and the second response indicates to the NBMP client whether the specific schedule was set in response to the second request.

According to exemplary embodiments, the at least one parameter defines whether scheduling of the NBMP workflow is based on any of units of duration and units of segments.

According to exemplary embodiments, the first request requests scaling capabilities, as the capabilities, of the NBMP workflow manager, and the second request instructs the NBMP workflow manager to set the at least one parameter based on the scaling capabilities.

According to exemplary embodiments, there is further, of the computer program code, second transmitting code configured to cause the at least one processor to transmit a second response from the NBMP workflow manager to the NBMP client, and the second request instructs the NBMP workflow manager to set a specific scaling for the running workflow, and the second response indicates to the NBMP client whether the specific scaling was set in response to the second request.

According to exemplary embodiments, the running workflow comprises a workflow descriptor (WD) indicating a workflow descriptor document (WDD), and controlling the NBMP workflow manager to set the at least one parameter of the NBMP workflow in response to and based on the second request comprises adding a descriptor to the WDD during an UpdateWorkflow operation and based on the at least one parameter.

According to exemplary embodiments, the second response comprises returning an updated WDD to the NBMP client based on adding the descriptor to the WDD.

According to exemplary embodiments, the at least one parameter defines scaling by any of upgrading a media processing entity and adding parallel tasks to existing tasks of the running workflow.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Embodiments described herein provide functional improvements to a Moving Picture Experts Group (MPEG) network based media processing (NBMP) standard. Such improvements increase media processing efficiency, increase speed and lower cost of deployment of media services, and allow large scale deployment of media services by leveraging public, private or hybrid cloud services.

In examples, the functional improvements to the MPEG NBMP standard include a harmonization of Workflow, Task and Functions, and defining a one-to-one relationship between logical items, data documents and REST resources for each of them. Access to main and basic descriptors may be enabled by creating representational state transfer (REST) resources for every descriptor. And call flows may be added for any of scheduling and scaling of the workflows.

Figure 1:
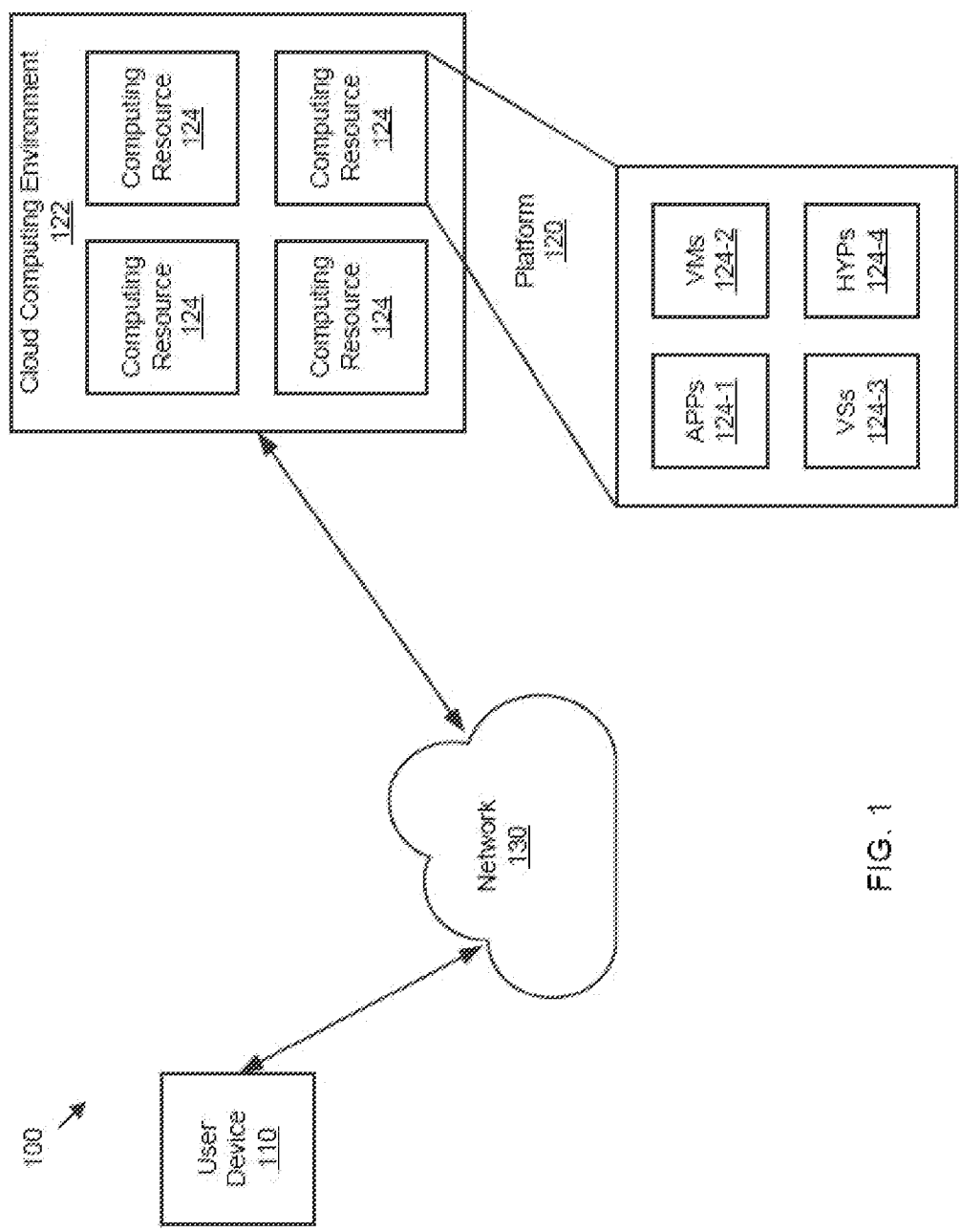
FIG. 1 is a simplified schematic illustration of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
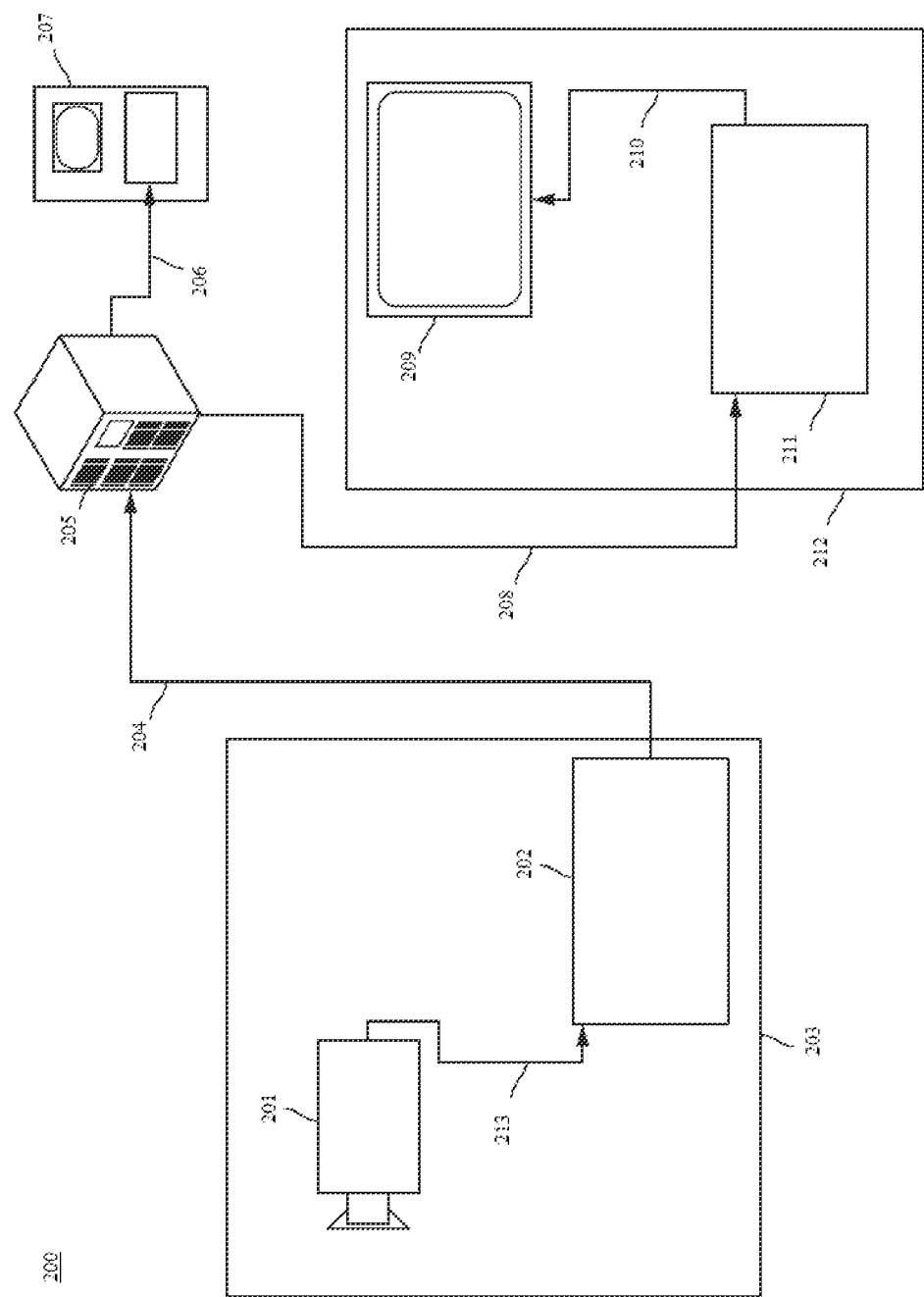
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
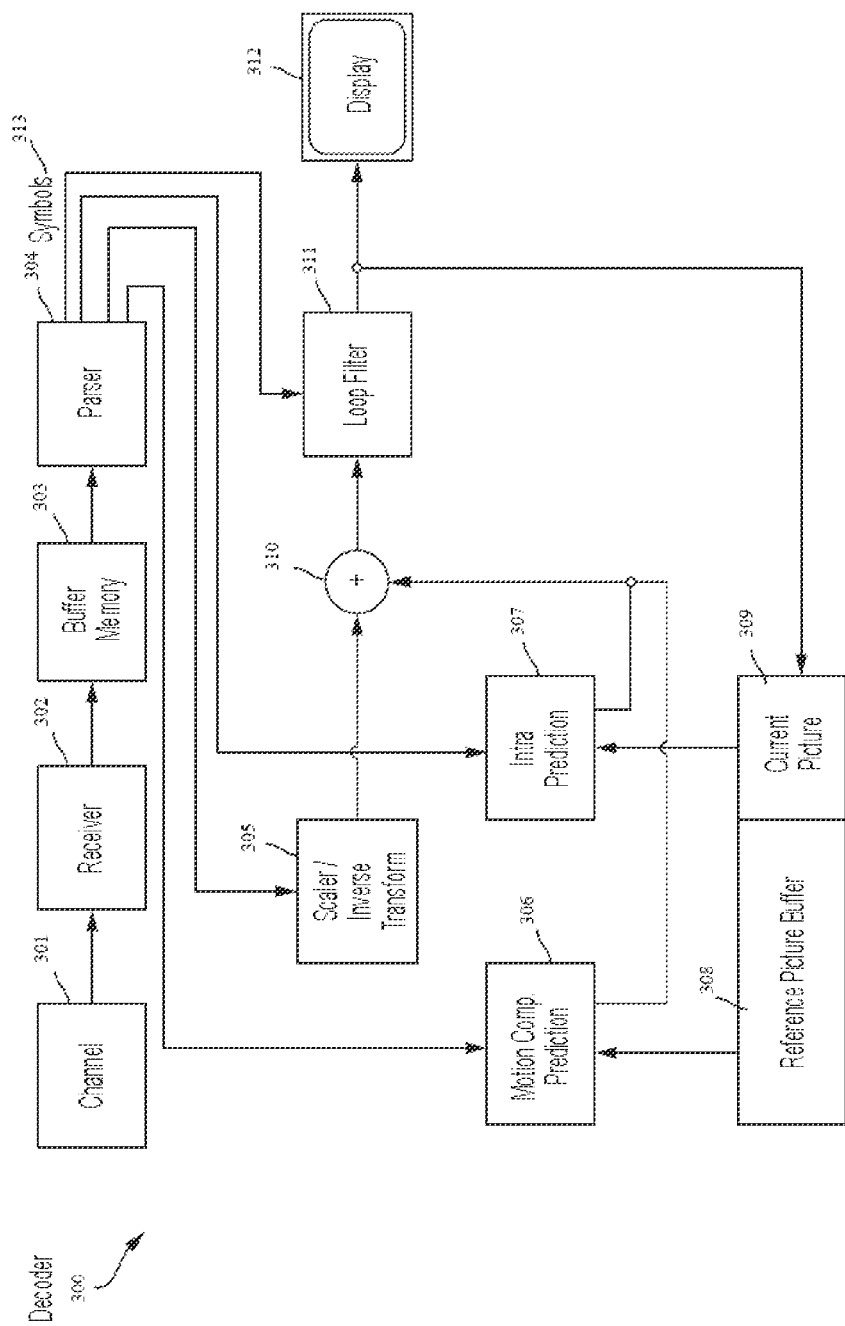
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the display 312, which may be a render device, as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
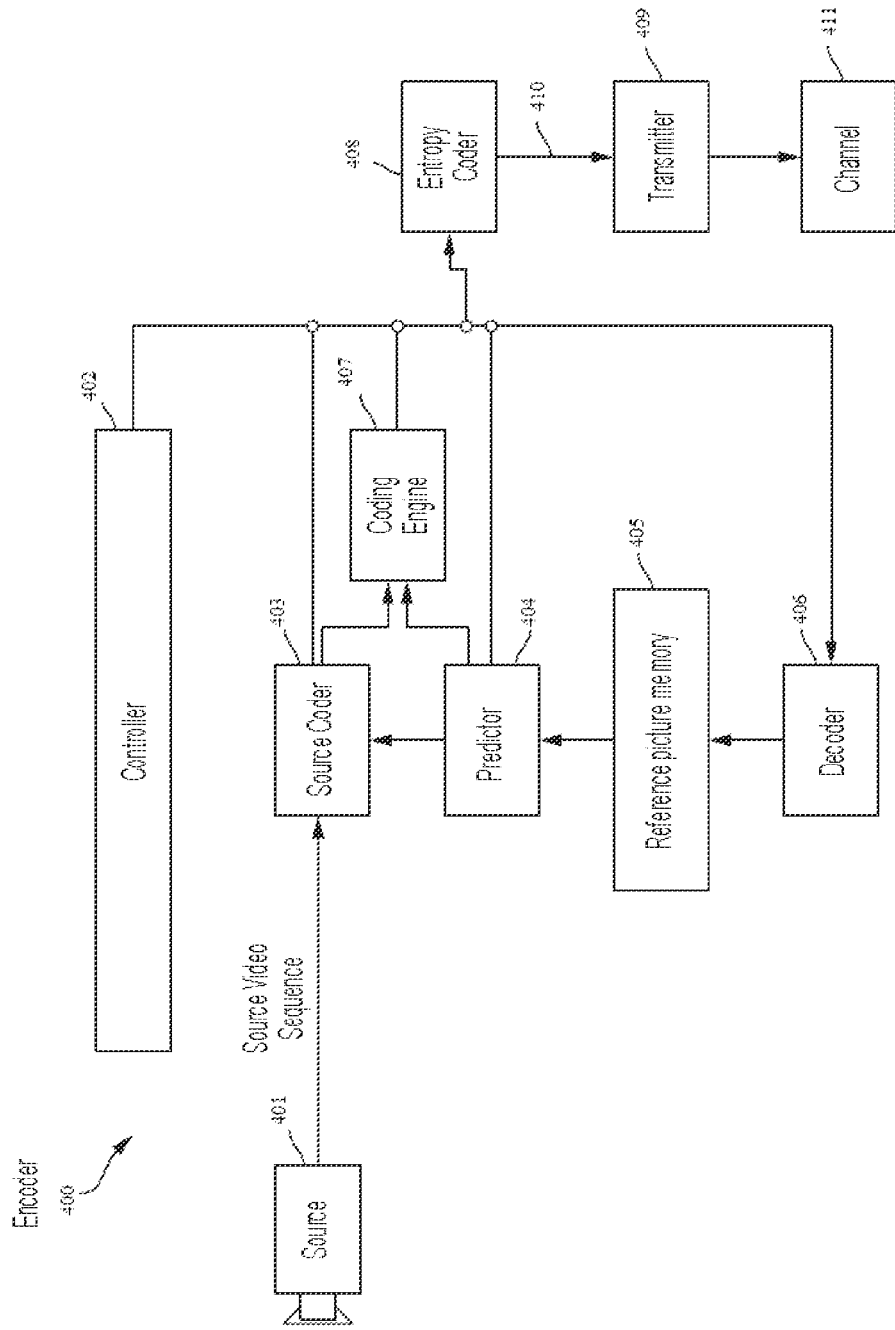
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder (for example a source coder 403) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405. which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
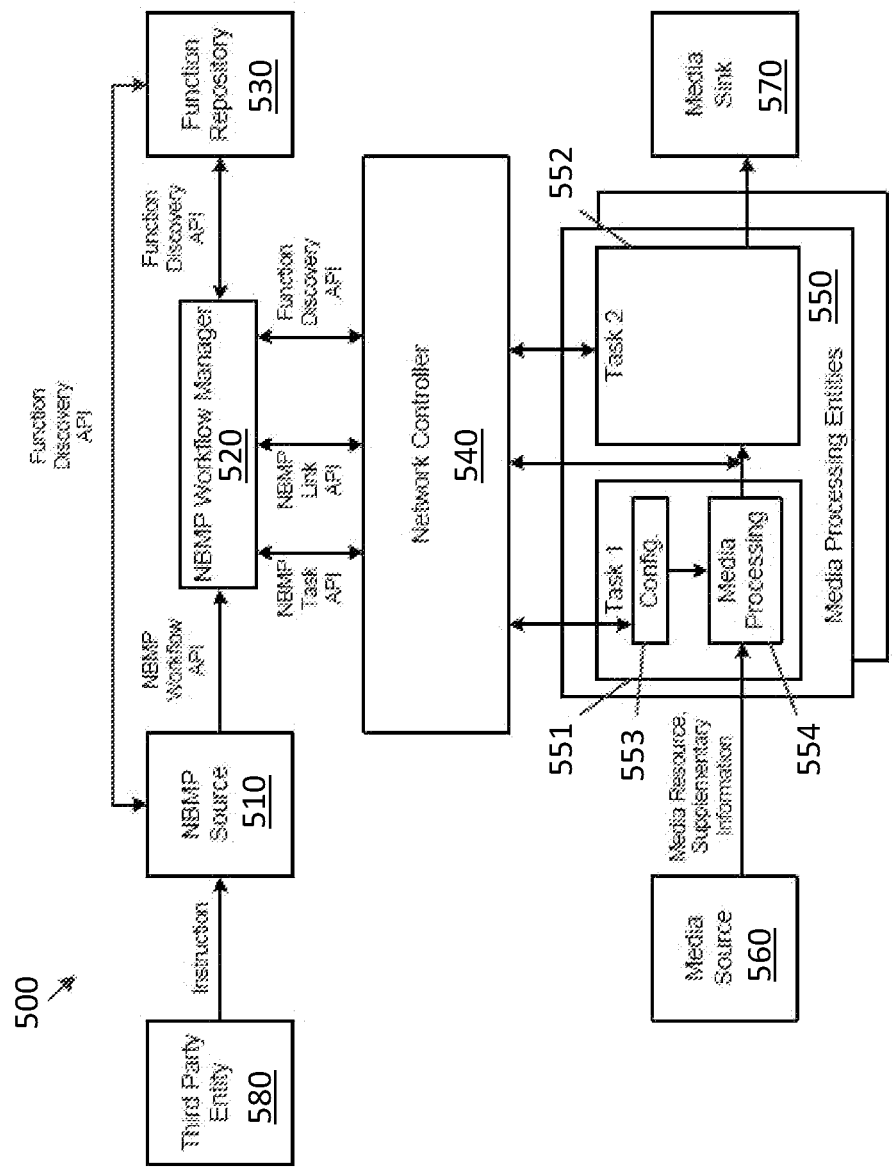
FIG. 5 is a simplified block diagram of a network based media processing (NBMP) system according to embodiments.

FIG. 5 is a block diagram of an NBMP system 500, according to embodiments.

Referring to FIG. 5, the NBMP system 500 includes an NBMP source 510, an NBMP workflow manager 520, a function repository 530, a network controller 540, one or more media processing entities 550, a media source 560, and a media sink 570.

The NBMP source 510 may receive instructions from a third party entity 580, may communicate with the NBMP workflow manager 520 via an NBMP workflow API, and may communicate with the function repository 530 via a function discovery API. For example, the NBMP source 510 may send a workflow description document to the NBMP workflow manager 520, and may read a function description of functions that are stored in a memory of the function repository 530. The functions may include media processing functions such as, for example, functions of media decoding, feature point extraction, camera parameter extraction, projection method, seam information extraction, blending, post-processing, and encoding. The NBMP source 510 may include at least one processor and a memory that stores code configured to cause the at least processor to perform functions of the NBMP source 510.

The NBMP source 510 may request the NBMP workflow manager 520 to create workflow including tasks 551 and 552 to be performed by the one or more media processing entities 550, by sending the workflow description document to the NBMP workflow manager 520. The workflow description document may include descriptors, each of which may include parameters.

For example, the NBMP source 510 may select one or more of the functions stored in the function repository 530, and send, to the NBMP workflow manager 520, the workflow description document including the descriptors for describing details such as input and output data, the selected one or more of the functions, and requirements for a workflow. The workflow description document may further include a set of task descriptions and a connection map of inputs and outputs of the tasks 551 and 552 to be performed by the one or more of the media processing entities 550. When the NBMP workflow manager 520 receives such information from the NBMP source 510, the NBMP workflow manager 520 may create the workflow by instantiating the tasks 551 and 552 based on function names and connecting the tasks 551 and 552 in accordance with the connection map.

Alternatively or additionally, the NBMP source 510 may request the NBMP workflow manager 520 to create a workflow by using a set of keywords. For example, the NBMP source 510 may send, to the NBMP workflow manager 520, the workflow description document including the set of the keywords that the NBMP workflow manager 520 may use to find appropriate one or more of the functions stored in the function repository 530. When the NBMP workflow manager 520 receives such information from the NBMP source 510, the NBMP workflow manager 520 may create the workflow by searching for the appropriate one or more of the functions, using the keywords that may be specified in a Processing Descriptor of the workflow description document, and by using other descriptors in the workflow description document to provision and connect the tasks 551 and 552.

The NBMP workflow manager 520 may communicate with the function repository 530 via a function discovery API, and may communicate with one or more of the media processing entities 550, through the network controller 540, via an NBMP task API, an NBMP link API, and a function discovery API. The NBMP workflow manager 520 may include at least one processor and a memory that stores code configured to cause the at least processor to perform functions of the NBMP workflow manager 520.

The NBMP workflow manager 520 may use the NBMP task API to setup, configure, manage, and monitor one or more of the tasks 551 and 552 of the workflow that is performable by the one or more media processing entities 550. In embodiments, the NBMP workflow manager 520 may use the NBMP task API to update and destroy the tasks 551 and 552. To configure, manage, and monitor the tasks 551 and 552 of the workflow, the NBMP workflow manager 520 may send messages, such as requests, to one or more of the media processing entities 550, wherein each message may have descriptors, each of which may include parameters. The tasks 551 and 552 may each include one or more media processing functions 554 and one or more configurations 553 for the one or more media processing functions 554.

In embodiments, after receiving the workflow description document from the NBMP source 510 that does not include a list of tasks (e.g., includes a list of keywords instead of a list of tasks), the NBMP workflow manager 520 may select the tasks based on descriptions of the tasks in the workflow description document, to search the function repository 530, via the function discovery API, to find appropriate one or more of the functions to run as the tasks 551 and 552 for the current workflow. For example, the NBMP workflow manager 520 may select the tasks based on keywords that are provided in the workflow description document. After the appropriate one or more of the functions are identified using the keywords or the set of task descriptions that is provided by the NBMP source 510, the NBMP workflow manager 520 may configure the selected tasks in the workflow by using the NBMP task API. For example, the NBMP workflow manager 520 may extract configuration data from information that is received from the NBMP source, and configure the tasks 551 and 552 based on the extracted configuration data.

The one or more media processing entities 550 may be configured to receive media content from the media source 560, process the received media content in accordance with the workflow that includes the tasks 551 and 552 and is created by the NBMP workflow manager 520, and output the processed media content to the media sink 570. The one or more media processing entities 550 may each include at least one processor and a memory that stores code configured to cause the at least processor to perform functions of the one or more media processing entities 550.

The network controller 540 may include at least one processor and a memory that stores code configured to cause the at least processor to perform functions of the network controller 540.

The media source 560 may include memory that stores media and may be integrated with or separate from the NBMP source 510. In embodiments, the NBMP workflow manager 520 may notify the NBMP source 510 and/or the media source 560 when a workflow is prepared, and the media source 560 may transmit media content to the one or more of the media processing entities 550 based on a notification that the workflow is prepared.

The media sink 570 may include at least one processor and at least one display that is configured to display media content that is processed by the one or more media processing entities 550.

The third party entity 580 may include at least one processor and a memory that stores code configured to cause the at least processor to perform functions of the third party entity 380.

As discussed above, messages from the NBMP source 510 (e.g. a workflow description document for requesting creation of a workflow) to the NBMP workflow manager 520, and messages (e.g. for causing the workflow to be performed) from the NBMP workflow manager 520 to the one or more media processing entities 550 may include descriptors, each of which including parameters. In embodiments, communication between any of components of the NBMP system 500 using an API may include descriptors, each of which including parameters.

Figure 6:
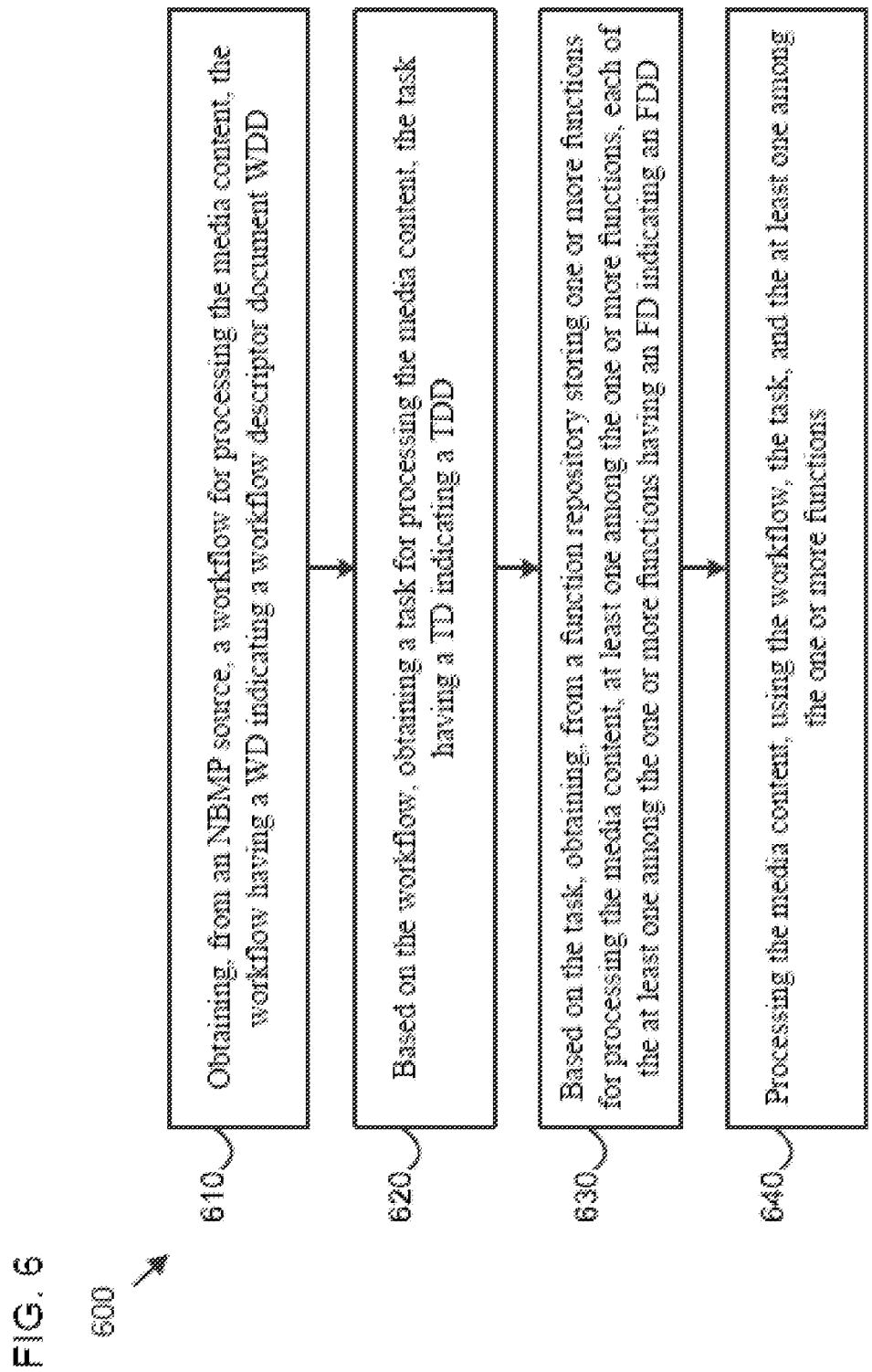
FIG. 6 is a simplified flowchart of a method of processing media content in Moving Picture Experts Group (MPEG) NBMP according to embodiments.

FIG. 6 is a flowchart of a method 600 of processing media content in MPEG NBMP, according to embodiments. In some implementations, one or more process blocks of FIG. 6 may be performed by the platform 120 implementing the NBMP system 300. In some implementations, one or more process blocks of FIG. 6 may be performed by another device or a group of devices separate from or including the platform 120 implementing the NBMP system 300, such as the user device 110.

As shown in FIG. 6, in operation 610, the method 600 includes obtaining, from an NBMP source, for example NBMP source 310, a workflow for processing the media content, the workflow having a WD indicating a workflow descriptor document WDD.

In operation 620, the method 600 includes, based on the workflow, obtaining a task for processing the media content, the task having a TD indicating a TDD.

In operation 630, the method 600 includes, based on the task, obtaining at least one among the one or more functions from a function repository storing one or more functions for processing the media content, for example function repository 330, wherein each of the at least one among the one or more functions has an FD indicating an FDD.

In operation 640, the method 600 includes processing the media content, using the workflow, the task, and the at least one among the one or more functions.

In an embodiment, the workflow may include a workflow representational state transfer (REST) resource (WR), the task may include a task REST resource (TR), and the at least one among the one or more functions may include a function REST resource.

In an embodiment, the WD, the TD, and the FD may be constructed from one or more general descriptors.

In an embodiment, the WDD may include a workflow description object (WO), the TDD may include a task description object (TO), and the FDD may include at least one function description object (FO).

In an embodiment, the WO, the TO, and the at least one FO include at least one JavaScript Object Notation (JSON) object or at least one Extensible Markup Language (XML) element.

In an embodiment, the WDD may include first link object including a first uniform resource locator (URL) indicating a location of the WDD, the TDD may include a second link object including a second uniform resource locator (URL) indicating a location of the TDD, and the FDD may include a third link object including a third uniform resource locator (URL) indicating a location of the FDD.

In an embodiment, the TD may include a state descriptor indicating a state of the task.

In an embodiment, the state descriptor may indicate that the state of the task is a null state.

In an embodiment, the at least one among the one or more functions may be retrieved from the function repository using a hyper text transfer protocol (HTTP) query including a search key and a search value corresponding to the at least one among the one or more functions.

In an embodiment, the search value may include at least one from an identifier, a name, a description, a brand, or a keyword associated with the at least one among the one or more functions.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Figure 7:
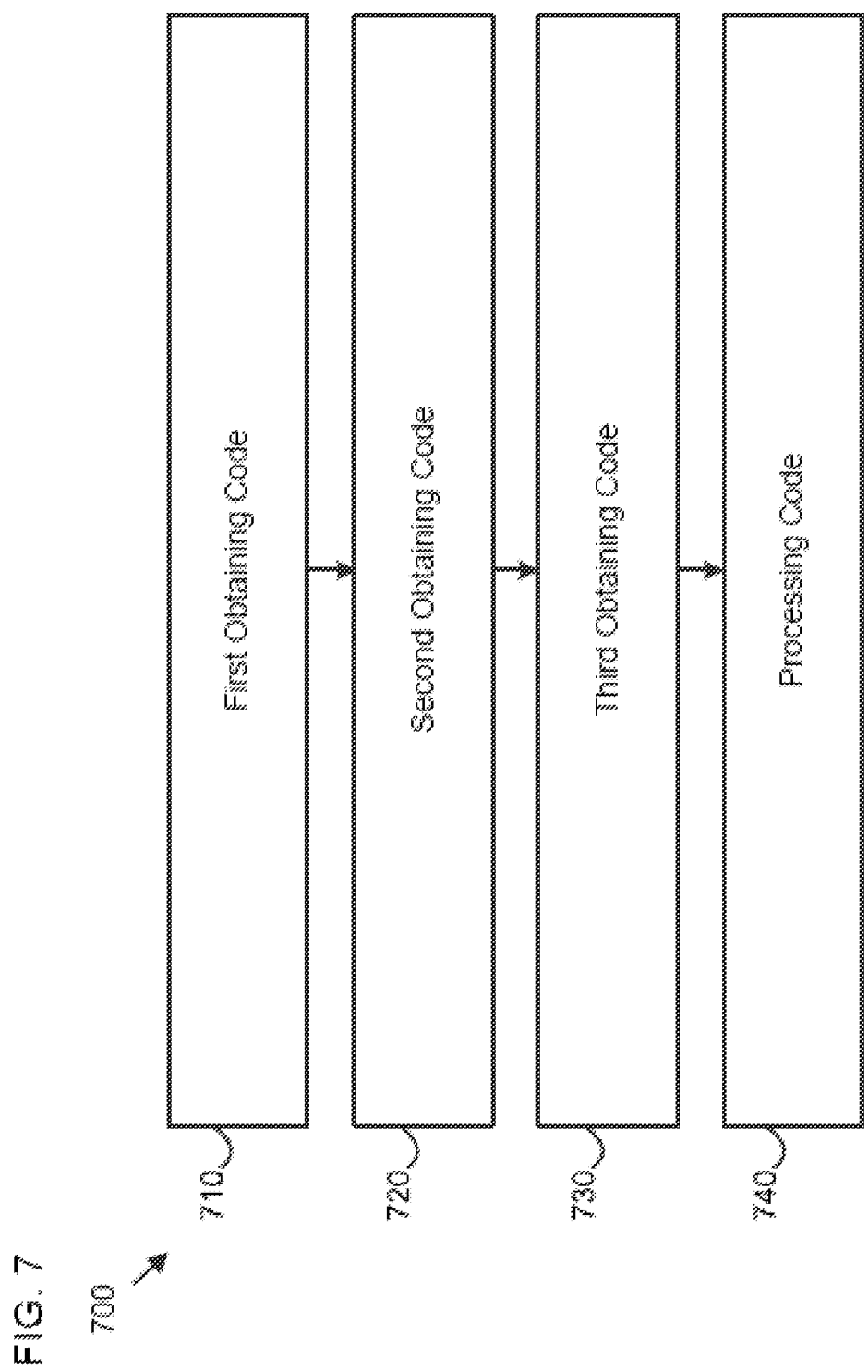
FIG. 7 is a simplified block diagram of an apparatus for processing media content in MPEG NBMP, according to embodiments.

FIG. 7 is a diagram of an apparatus 700 for processing media content in MPEG NBMP, according to embodiments. As shown in FIG. 7, the apparatus 700 includes first obtaining code 710, second obtaining code 720, third obtaining code 730, and processing code 740.

The first obtaining code 710 may be configured to cause the at least one processor to obtain, from an NBMP source such as NBMP source 310, a workflow for processing the media content, the workflow having a workflow descriptor (WD) indicating a workflow descriptor document (WDD).

The second obtaining code 720 may be configured to cause the at least one processor to obtain, based on the workflow, a task for processing the media content, the task having a task descriptor (TD) indicating a task descriptor document (TDD).

The third obtaining code 730 may be configured to cause the at least one processor to obtain, based on the task, at least one among the one or more functions from a function repository storing one or more functions for processing the media content, for example function repository 330, wherein each of the at least one among the one or more functions has an FD indicating an FDD.

The processing code 740 may be configured to cause the at least one processor to process the media content, using the workflow, the task, and the at least one among the one or more functions.

In an embodiment, the workflow may include a workflow representational state transfer (REST) resource (WR), the task may include a task REST resource (TR), and the at least one among the one or more functions may include a function REST resource.

In an embodiment, the WD, the TD, and the FD may be constructed from one or more general descriptors.

In an embodiment, the WDD may include a workflow description object (WO), the TDD may include a task description object (TO), and the FDD may include at least one function description object (FO).

In an embodiment, the WO, the TO, and the at least one FO include at least one JavaScript Object Notation (JSON) object or at least one Extensible Markup Language (XML) element.

In an embodiment, the WDD may include first link object including a first uniform resource locator (URL) indicating a location of the WDD, the TDD may include a second link object including a second uniform resource locator (URL) indicating a location of the TDD, and the FDD may include a third link object including a third uniform resource locator (URL) indicating a location of the FDD.

In an embodiment, the TD may include a state descriptor indicating a state of the task.

In an embodiment, the state descriptor may indicate that the state of the task is a null state.

In an embodiment, the at least one among the one or more functions may be retrieved from the function repository using a hyper text transfer protocol (HTTP) query including a search key and a search value corresponding to the at least one among the one or more functions.

In an embodiment, the search value may include at least one from an identifier, a name, a description, a brand, or a keyword associated with the at least one among the one or more functions.

The current NBMP specification has a concept of template for task and functions, while defining a document for workflow description referred to as a workflow description document (WDD). Furthermore, it is not clear how task and function templates are converted to REST resources. The API documentation does not clearly define the exact syntax of resources, or how what resources are included in acknowledge of a API operation.

An NBMP specification according to embodiments aligns the concepts of logical items, JOSN objects/XML documents, and REST resources for the three items: workflow, task and function, and builds a harmonized and aligned structure for all there. Furthermore, it defines the resource format and constraints in acknowledgements, to make the interfaces true REST APIs.

Figure 8:
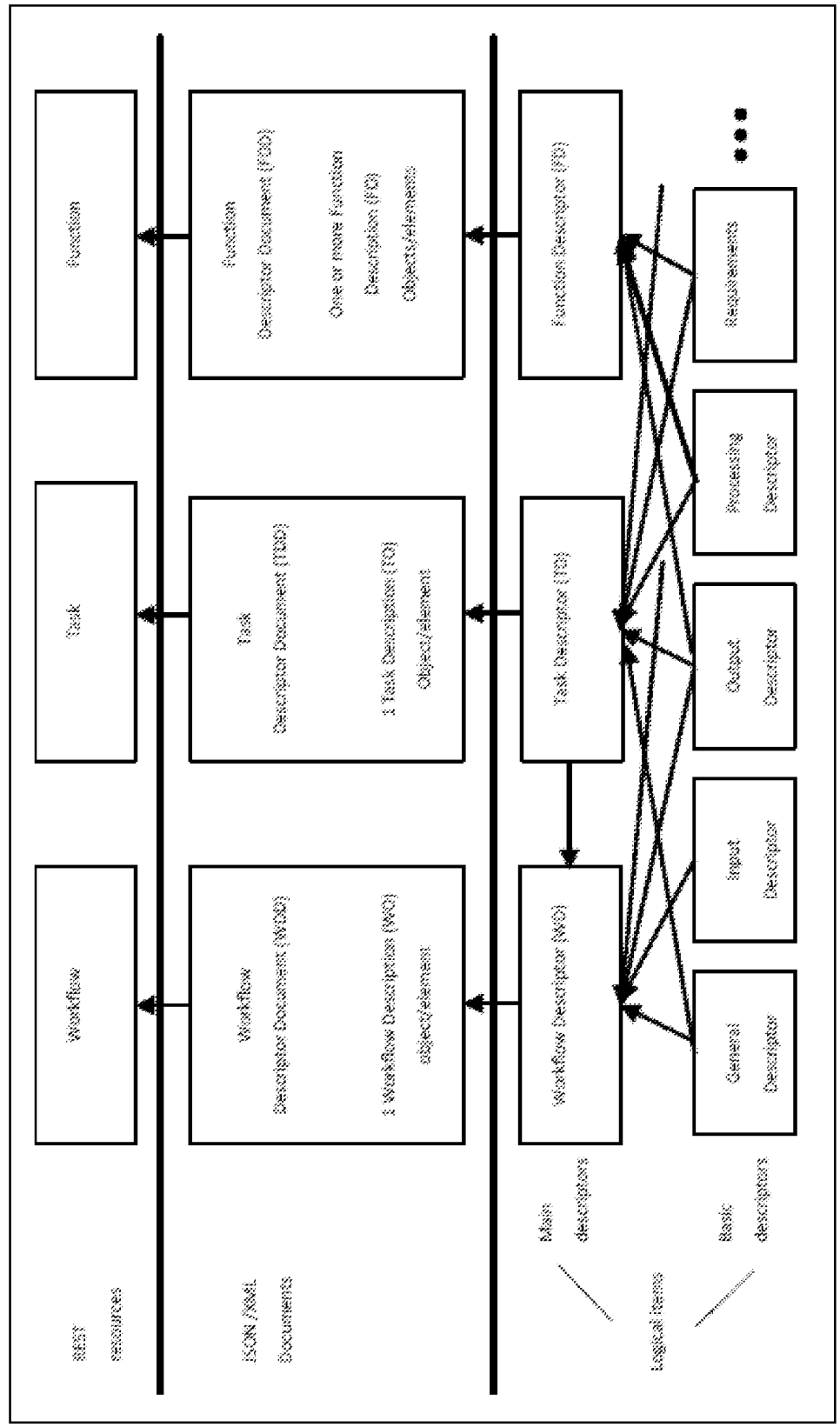
FIG. 8 is a simplified block diagram of an updated logical structure of an NBMP system, according to embodiments.

FIG. 8 shows an example 800 of the relationship between the three entities, as logical items, JSON/XML documents and REST resources.

As can be seen in FIG. 8, logical items may be defined as descriptors. The three main descriptors may be a workflow descriptor (WD), a task descriptor (TD) and a function descriptor (FD). WD, TD, and FD may be built as combinations of the basic descriptors, such as a general descriptor, an input descriptor, an output descriptor, and others.

Workflow description objects (WO), task description objects (TO), and function description objects (FO) may be code realizations of the corresponding logic items, for example, WD, TD, and FD, in JSON or XML.

WDD, task description documents (TDD), and function description documents (FDD) may be documents containing WOs, TOs, and FOs. Documents may be objects in JSON and XML document in XML. Note that FDD may differ from WDD and TDD in the sense that it may include one or more FOs.

Workflow resources (WR), task resources (TR), and function resources (FR) may be WDD, TDD, or FDD includes URLs, and therefore may be identified as REST resources.

A major benefit of the example NBMP specification discussed above is that there may be a one to one relationship between main descriptors, documents, and REST resources, which may allow the system to be precisely specified, and may allow interoperable solutions to be built accordingly.

Designating the Main and Basic Descriptors as REST Resources

The current NBMP specification only enables accessing WR, TR and FR. An NBMP specification according to embodiments may make WR, TR, and FR, REST resources, and also enable the main and basic descriptors to become a REST resource. Therefore, these descriptors may be individually accessed using the NBMP APIs. In this design, each main and basic descriptor object of an included WDD, TDD and FDD in any response may include include one "link" object, including a "ref" with value "self" and a URL indicating the location to that object.

Adding the Task Descriptor as a Component of Workflow Descriptor

The current NBMP specification does not include the Task Descriptor as part of workflow. It defines the relationship between them using ConnectionMap descriptor, which also includes the function identifiers.

However, for an NBMP source to have a complete workflow diagram, an NBMP specification according to embodiments may include task descriptors also in the workflow descriptor, as shown for example in Table 1.

TABLE 1

Adding Task Descriptor to Workflow Descriptor (WD)

| Descriptor | Description | Cardinality |
|---|---|---|
| Scheme | Defines the scheme and specification that this WD is conforming to. | 1 |

TABLE 1-continued

Adding Task Descriptor to Workflow Descriptor (WD)

| Descriptor | Description | Cardinality |
|---|---|---|
| General | Parameters of the General descriptors are applicable except the following: InputPorts OutputPorts | 1 |
| Input | Parameters of the Input descriptor | 1 |
| Output | Parameters of the Output descriptor | 1 |
| Task | Parameters of the Task Descriptor | 0-N |
| Processing | Parameters of the Processing descriptor are applicable except the following: URL | 0-1 |
| Requirement | Parameters of the Requirement descriptor | 1 |
| Client Assistance | Parameters of the Client Assistance descriptor | 0-1 |
| Failover | Parameters of the Failover descriptor | 0-1 |
| Monitoring | Parameters of the Monitoring descriptor are applicable except the following: Variable | 0-1 |
| Assertion | Parameters of the Assertion descriptor | 0-1 |
| Reporting | Parameters of the Reporting descriptor | 0-1 |
| Notification | Parameters of the Notification descriptor | 0-1 |

In Table 1, an additional item, task descriptor, is added. With this addition, a workflow descriptor may describe the complete map and information about a created workflow.

Adding Media Source and Sink to Workflow DAG

The current NBMP specification does not include the media source 560 and sink 570 in its workflow directed acyclic graph (DAG) description.

An NBMP specification according to embodiments adds these elements to workflow DAG. A benefit of this approach is that the resource requirements for network connection between media source 560 and workflow in on hand, and between Workflow and media sink 570 can be described with the same DAG. This approach simplifies the documentation of requirements as well as the establishment and management of workflow by NBMP Workflow Manager.

Adding the Task's Life-Cycle State to General Descriptor

The current NBMP specification defines a life-cycle for tasks. The life-cycle has 5 states. However, the state of the current state of a Task in not described in any descriptors.

An NBMP specification according to embodiments builds based on REST APIs. Each REST resource must also capture its state. Therefore, the resource maintains the complete status of the logical item and there is no need to acquire the state from other data structure.

The NBMP specification according to embodiments adds a "state" parameter to general descriptor, which can be used to describe a task's state. This addition is shown in Table 2.

TABLE 2

Addition of "state" parameter to General Descriptor

| Parameter Name | Description | Data Type | Cardinality |
|---|---|---|---|
| Id | Provides a unique identification in the scope of Repository/ Workflow to the resource. | String | 1 |
| Name | Provides a name for identifying the resource. | String | 1 |
| Description | Provides a human readable description for the underlying resource. | String | 1 |
| Brand | Provides category information for the underlying resource | String | 1 |
| Published Time | The date and time of publication of this document | String | 1 |
| Repository Location | Provides the Repository's URL that this resource or its corresponding Function Description is located | String | 1 |
| Priority | Provides priority information for the underlying resource. | Number | 0-1 |
| Execution Time | Provides execution time of the resource | String | 0-1 |
| InputPorts | Includes a map of port information where: 1. Map key: Port Identifier 2. Map value: an object with the following parameters: Stream Id in Input Descriptor Stream Data Type in Input Descriptor | Map | 1 |
| OutputPorts | Includes a map of port information where: 3. Map key: Port Identifier Map value: an object which is structured: Stream Id in Output Descriptor Stream Data Type in Output Descriptor | Map | 1 |
| State | Providing the current state of the item in its life-cycle The value of this parameter shall be one of the followings: Null Instantiated Idle Running In Error Destroyed | String | 1 |

As shown in Table 2, and as illustrated in FIG. 3, a new state "Null" may also added to the life-cycle to capture the initial state of a Task in its life cycle.

Designate NBWP APIs as REST APIs

The current NBMP specification is not clear how the API operations, requests and responses work. The documentation does not define interoperable APIs at this stage.

An NBMP specification according to embodiments designs NBMP APIs as REST API. Therefore, all API operations may be implemented as REST methods using HTTP 1. 1, and the requests and responses may include REST resources, as shown in FIG. 2. Furthermore, the HTTP status code is used.

Tables 3, 4 and 5 describes the improved NBMP APIs, their requests and responses.

TABLE 3

Improved Workflow API Operations

| Operation | Description | Request resource requirements | Response Requirements |
|---|---|---|---|
| CreateWorkflow | Create a workflow | WR including information needed to create a workflow The General descriptor's Id shall not be included in this request | If successful, shall include: 1) HTTP status code 2xx 2) Response's body with updated WR including: a) A value for General descriptor's Id b) Updated information including endpoint information where to send media data, metadata, and other information If failed, shall include: 1) HTTP status codes 4xx or 5xx 2) Optionally, response's body with updated WR signaling failed descriptors or parameters |
| UpdateWorkflow | Update a previously created workflow | Updated WR with identical General's Id, previously received in Create Workflow's response | If successful, shall include: 1) HTTP status code 2xx 2) Response's body with updated WR including: General descriptor's Id identical to the one in the request Updated information including endpoint information where to send media data, metadata, and other information If failed, shall include: 1) HTTP status codes 4xx or 5xx 2) Response's body with updated WR signaling failed descriptors or parameters |
| DeleteWorkflow | Terminate a previously created workflow | WR with identical General's Id, previously received in CreateWorkflow's response | If successful, shall include: HTTP status code 2xx If failed, shall include: 1) HTTP status codes 4xx or 5xx 2) Response's body with updated WR signaling failed descriptors or parameters |
| RetrieveWorkflow | Retrieve a previously configured workflow | WR with identical General's Id, previously received in CreateWorkflow's response | If successful, shall include: 1) HTTP status code 2xx 2) Response's body with updated WR including: General descriptor's Id identical to the one in the request Updated information including endpoint information where to send media data, metadata, and other information If failed, shall include: 1) HTTP status codes 4xx or 5xx 2) Response's body with updated WR signaling failed descriptors or parameters |
| GetReports | Get reports for a previously configured workflow | WR with identical General's Id, previously received in CreateWorkflow's response and Report descriptors | If successful, shall include: 1) HTTP status code 2xx 2) Response's body with updated WR including: General descriptor's Id identical to the one in the request Updated report descriptors which were included in the request If failed, shall include: 1) HTTP status codes 4xx or 5xx 2) Response's body with updated WR signaling failed descriptors or parameters |

TABLE 4

Improved Task Configuration Operations

| Operation | Description | Request Parameters | Response Requirements |
|---|---|---|---|
| CreateTask | Provision to run a task inside the media processing entity | TR including information needed to create a workflow The General descriptor's Id shall not be included in this request. | If successful, shall include:<br>3) HTTP status code 2xx<br>4) Response's body with updated TR including:<br>a) A value for General descriptor's Id<br>b) Updated information including endpoint information where to send media data, metadata, and other information<br>If failed, shall include:<br>3) HTTP status codes 4xx or 5xx<br>Optionally, response's body with updated TR signaling failed descriptors or parameters |
| UpdateTask | Modify the task running inside the media processing entity | Updated TR with identical General's Id, previously received in CreateTask's response | If successful, shall include:<br>3) HTTP status code 2xx<br>4) Response's body with updated TR including:<br>General descriptor's Id identical to the one in the request<br>Updated information including endpoint information where to send media data, metadata, and other information<br>If failed, shall include:<br>3) HTTP status codes 4xx or 5xx<br>4) Response's body with updated TR signalling failed descriptors or parameters |
| GetTask | Retrieve task configuration information | TR with identical General's Id, previously received in CreateTask's response | If successful, shall include:<br>3) HTTP status code 2xx<br>4) Response's body with updated TR including:<br>General descriptor's Id identical to the one in the request<br>Updated report descriptors which were included in the request<br>If failed, shall include:<br>3) HTTP status codes 4xx or 5xx<br>Response's body with updated TR signalling failed descriptors or parameters |
| DeleteTask | Request to de-provision the task running inside the media processing entity | TR with identical General's Id, previously received in CreateTask's response. | If successful, shall include:<br>1. HTTP status code 2xx<br>If failed, shall include:<br>HTTP status codes 4xx or 5xx<br>Response's body with updated TR signalling failed descriptors or parameters |

TABLE 5

Improved Function Discovery API Operations

| Operation | Description | Request Parameters | Response |
|---|---|---|---|
| DiscoverAll-Functions | Discover all functions in the function repository | Query string shall be empty, i.e. only '?' added to the end of Function Repository's URL | If successful, shall include:<br>1) HTTP status code 2xx<br>2) Response's body including exactly one Function Description Document (FDD) containing FDs of all Function in Repository<br>If failed, shall include:<br>1) HTTP status codes 4xx or 5xx<br>If no Function is found in the repository, the response shall be considered successful and an empty FSD shall be included in the body. |

TABLE 5-continued

Improved Function Discovery API Operations

| Operation | Description | Request Parameters | Response |
|---|---|---|---|
| DiscoverSpecific-Function | Discover a set of functions matching a given string | Query string shall include the key-value pairs describing the desired properties of the target Function. | If successful, shall include: 1) HTTP status code 2xx 2) Response's body including exactly one Function Description Document (FDD) of all Function in Repository with the matching values per key If failed, shall include: 2) HTTP status codes 4xx or 5xx If search is performed and no Function is found, the response shall be considered successful and an empty FSD shall be included in the body. |

In Tables 3-5, the request and response body (data) may correspond to the REST resources.

Additionally, to make the response a complete REST resource, an NBMP specification according to embodiments may specify that the included WDD in any response may include one "link" object, including a "ref" with value "self" and a URL indicating the location to WDD. In addition, the included TDD in any response may include one "link" object, including a "ref" with value "self" and a URL indicating the location to TDD. Similarly, each included FDD in any response may include one "link" object, including a "ref" with value "self" and a URL indicating the location to FDD. Further, in every included FDD in any response, each Function Descriptor Object (FDO) may include one "link" object, including a "ref" with value "self" and a URL indicating the location of each FDO.

HTTP "Query String"-Based Search for Function Discovery

The current NBMP specification describes discovery operations. But it does not define the format and protocol of the operations. It also specifies that two keys are used for Function search: either by "identifier" or by "name", but not the combination of them.

An NBMP specification according to embodiments improves the discovery operations by using HTTP query string and combination of key-value pairs. So it defines a simple method (HTTP GET) to implement the operations. This allows the combination of keys to be used in the search. In addition, an NBMP specification according to embodiments adds more keys to the search parameters. Therefore, better search can be performed using different aspects of stored Function in the repository.

According to embodiments, a discovery query and a query string may be used to perform a search. The discovery query is to discover one or more Functions in Function Repository by the properties described in the query. The query string may be used to describe these properties; and he query string may include of a set of key-value pairs, separated by a single '&' character. In each key-value pair, the key and value shall be separated by single '=' character. A query string may be added to the end of resource URL after a single '?' character.

Table 6 lists examples of supported keys in the query string.

TABLE 6

Function query's keys

| | Descriptor and Parameter used for matching | |
|---|---|---|
| Query keys | Descriptor | Parameter |
| id | General | Identifier |
| name | General | Name |
| description | General | Description |
| brand | General | Brand |
| keywords | Processing | Keywords |

Further, although a standard NBMP specification may include a schedule descriptor, such standard, due to technical deficiencies, may not define call flows for scheduling a workflow, as such, embodiments described herein disclose a technical solution to such deficiency arising the in computer technology itself.

Figure 9:
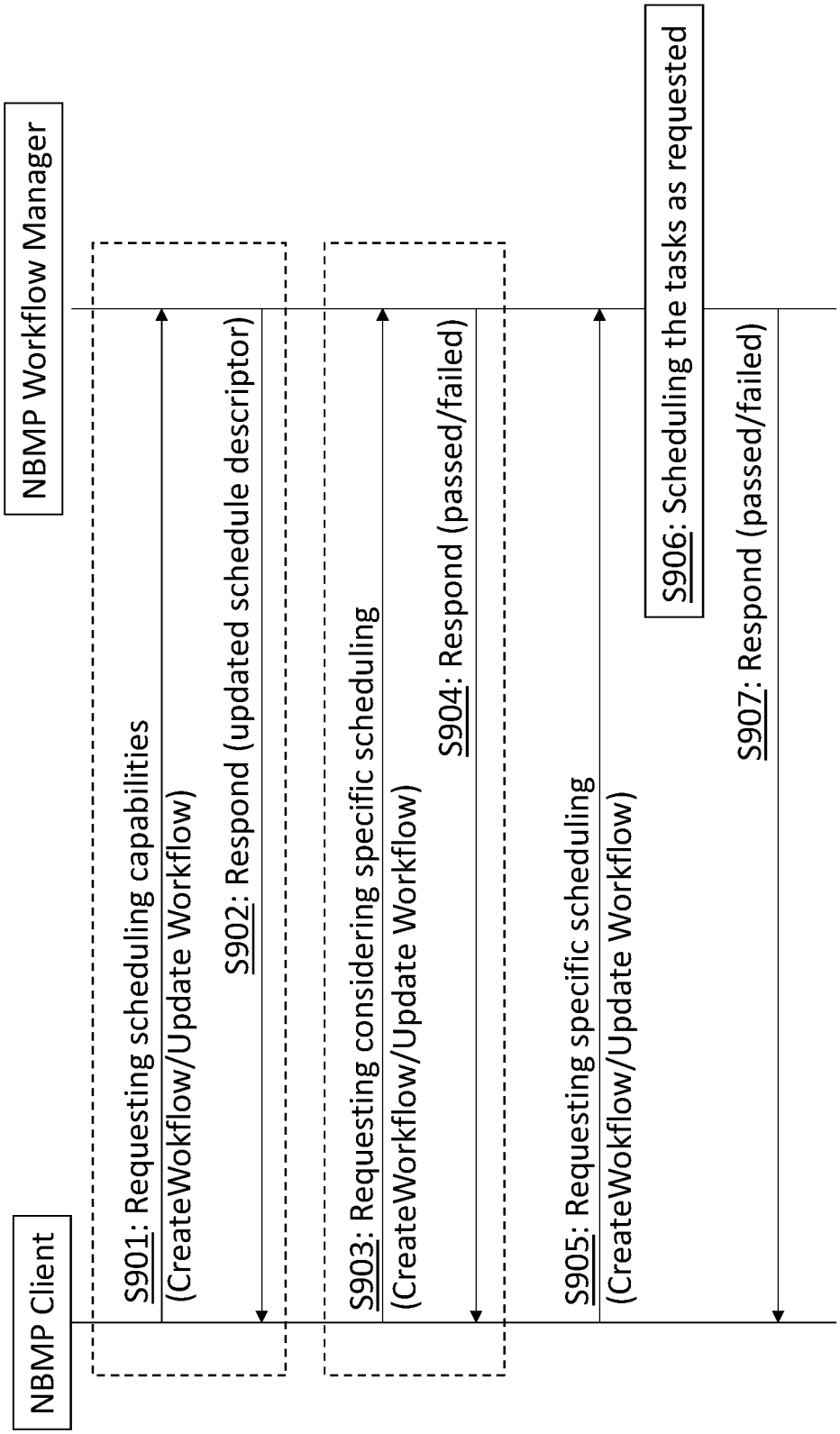
FIG. 9 is a simplified timing diagram in accordance with embodiments.

For example, FIG. 9 shows an example 900 of a timing diagram for one or more variations of such improvements by call flows for scheduling. As shown in FIG. 9, the NBMP client has at least two optional pre-scheduling steps, a combination of S1 and S2 and a combination of S3 and S4. For example, at S1, the NBMP client can request the scheduling capabilities of the platform from the workflow manager for the running workflow, or at S3, the NBMP client can request the workflow manager to consider a specific scheduling request for the running workflow.

In either case, the workflow manager responds to the NBMP client with its supporting capabilities and/or whether it can accommodate the requested scheduling request. Note that the NBMP client can request option A, S1 and S2, and option B, S3 and S4, in sequence too. The workflow manager collaborates with the platform and tasks to provide the NBMP client the response in either step.

After getting a satisfactory response, the NBMP client can, at S5, request a specific scheduling scheme, with the possibility of tailoring the scheduling scheme to the capabilities and responses that it received from the workflow manager. The workflow manager, at S6, collaborates with the platform and tasks to perform the scheduling and, at S7, send the result back to the NBMP client. The features of that S6 may also include the features shown in the example of FIGS. 6-8 and related descriptions provided herein which are separate to the scheduling features described in the exemplary embodiments of FIG. 9 herein.

According to exemplary embodiments, the following parameters may be used to address the above scheduling schemes:

A schedule-type parameter defining whether the scheduling is performed based on units of duration or in units of segments such that with duration, each step of scheduling is defined by a duration of time, and alternatively, with the number of segments, the execution of each task is performed by a fixed number of input segments.

For schedule-type 'duration', a schedule table needs to be included according to exemplary embodiments, the rows in the table may show the order of execution, and each row may have the following parameters:

List of tasks or task groups to be executed,

Start time using cron syntax and semantics, and

The duration of time of execution.

For schedule-type 'segment', the workflow may be executed task by task, one task at a time for a fixed number of segments that are defined by the parameter "number-of-segments", A flag 'loop' may also be signaled so as to allow for enabling of looping around a defined schedule.

A parameter 'status' may include both the type of requests by the NBMP client and the result of the request by the NBMP workflow manager.

Further, although a standard NBMP specification may include a scale descriptor, such standard, due to technical deficiencies, may not define call flows for scaling a workflow, as such, embodiments described herein disclose a technical solution to such deficiency arising the in computer technology itself.

Figure 10:
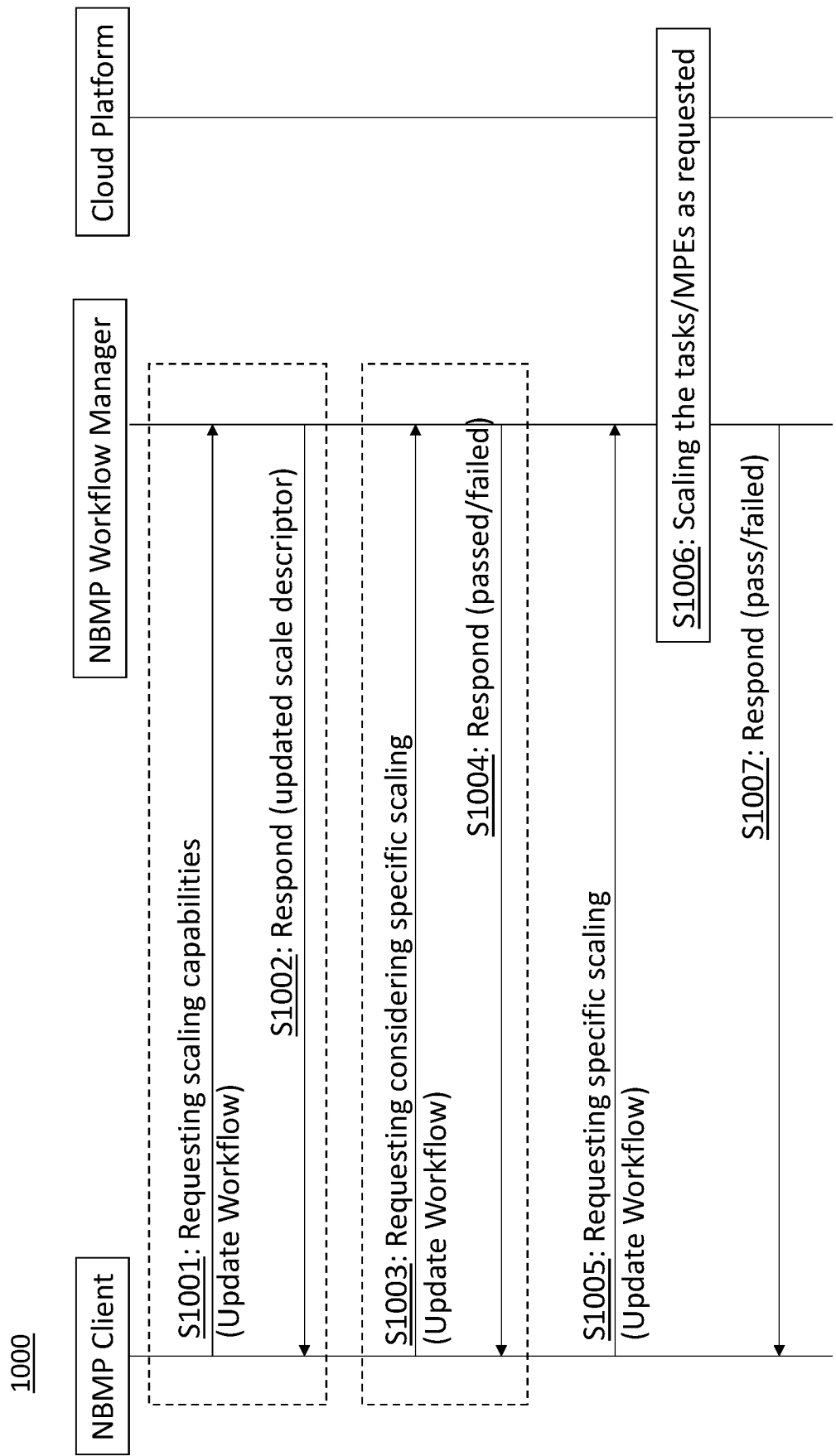
FIG. 10 is a simplified timing diagram in accordance with embodiments.

For example, FIG. 10 shows an example 1000 of a timing diagram for one or more variations of such improvements by call flows for scaling. As shown in FIG. 10, the NBMP client has at least two optional pre-scaling steps, a combination of S1 and S2 and a combination of S3 and S4. For example, at S1, the NBMP client can request the scaling capabilities of the platform from the workflow manager for the running workflow, or at S3, the NBMP client can request the workflow manager to consider a specific scaling request for the running workflow.

In either case, the workflow manager responds to the NBMP client with its supporting capabilities and/or whether it can accommodate the requested scaling request considering the running workflow. Note that the NBMP client can request option A, S1 and S2, and option B, S3 and S4, in sequence too. The workflow manager collaborates with the platform and tasks to provide the NBMP client the response in either step.

After getting a satisfactory response, the NBMP client can, at S5, request a specific scaling scheme, with the possibility of tailoring the scaling scheme to the capabilities and responses that it received from the workflow manager. The workflow manager, at S6, collaborates with the platform and tasks to perform the scaling and, at S7, send the result back to the NBMP client. The features of that S6 may also include the features shown in the example of FIGS. 6-8 and related descriptions provided herein which are separate to the scaling features described in the exemplary embodiments of FIG. 9 herein. The features of FIG. 9 and FIG. 10 may be implemented any of in sequence and in parallel to each other. That is, scheduling calls and scaling calls may be made between the NBMP client and workflow manager in sequence, either before or after the other, and in parallel.

According to exemplary embodiments, the following parameters may be used to address the above scaling schemes:

A "scaling-type" parameter may define a method of scaling to be by either by upgrading one or more media processing entities (MPEs), such as edge servers, cloud resources, and user devices, or by adding parallel tasks to existing tasks using split-merge functions.

A "scaling-factor" parameter may define a speed up or a number of parallel paths depending on the type of scaling.

A "status" parameter may indicate both the type of requests by the NBMP client and the result of the request by the NBMP workflow manager.

Further, the NBMP Client can add a scale descriptor, such as the parameters noted above, to WDD during a UpdateWorkflow operation including the value for the status parameter which defines the type of request. The workflow manager may respond to this request by returning the updated WDD including the updated scale descriptor according to exemplary embodiments.

The techniques described above, can be implemented as computer software using computer-readable instructions and physically stored in one or more computer-readable media or by a specifically configured one or more hardware processors. For example, FIG. 11 shows a computer system 1100 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
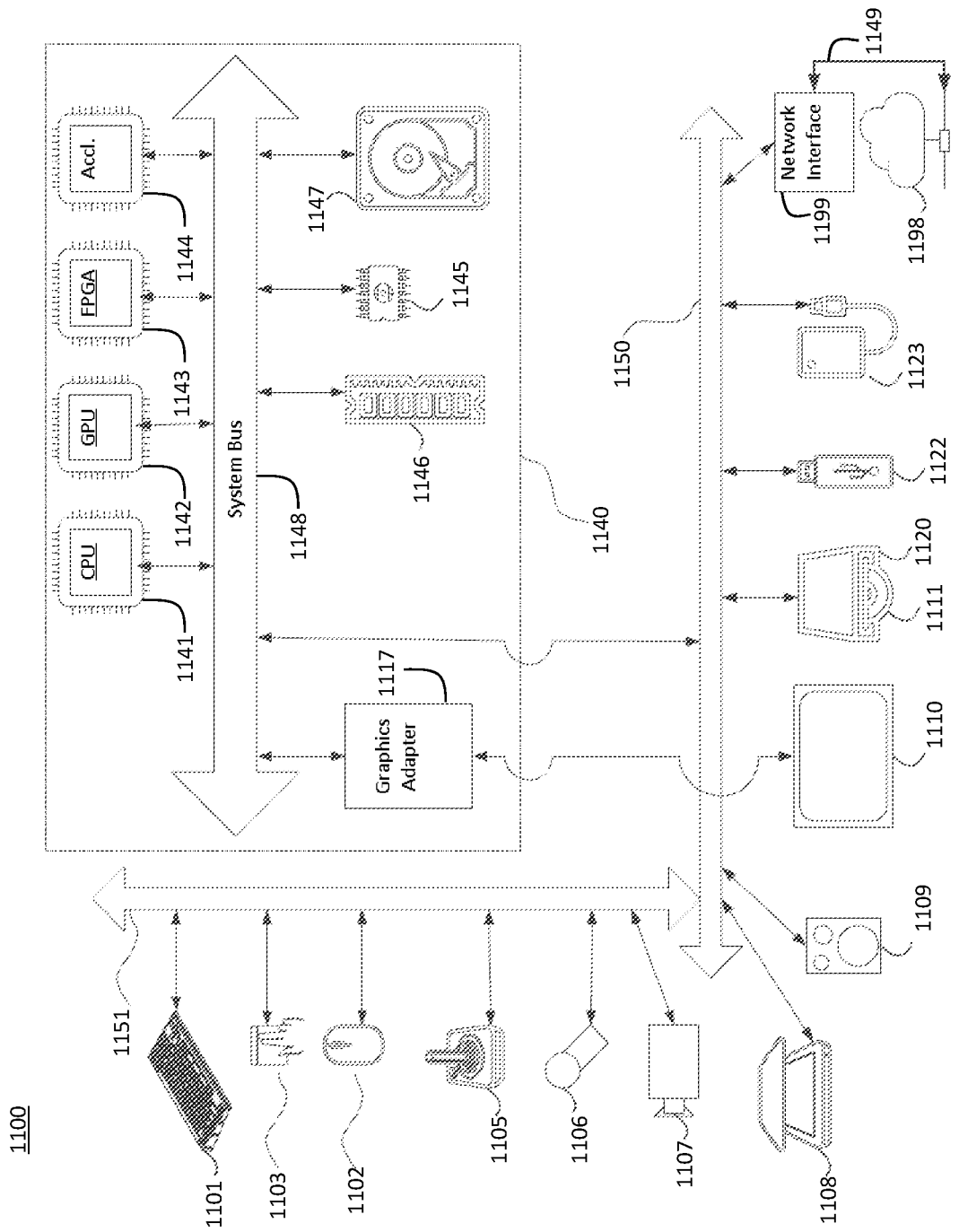
FIG. 11 is a simplified block diagram in accordance with embodiments.

The components shown in FIG. 11 for computer system 1100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, joystick 1105, microphone 1106, scanner 1108, camera 1107.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, or joystick 1105, but there can also be tactile feedback devices that do not serve as input devices), audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD 1111 or the like media, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface 1199 to one or more communication networks 1198. Networks 1198 can for example be wireless, wireline, optical. Networks 1198 can further be local, wide-area, metropolitan, vehicular and industrial, real-time, delay-tolerant, and so on. Examples of networks 1198 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1198 commonly require external network interface adapters that attached to certain general-purpose data ports or peripheral buses (1150 and 1151) (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks 1198, computer system 1100 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1140 of the computer system 1400.

The core 1140 can include one or more Central Processing Units (CPU) 1141, Graphics Processing Units (GPU) 1142, a graphics adapter 1117, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1151. Architectures for a peripheral bus include PCI, USB, and the like.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also be stored in RAM 1146, whereas permanent data can be stored for example, in the internal mass storage 1147. Fast storage and retrieval to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, an architecture corresponding to computer system 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing a media content in Moving Picture Experts Group (MPEG) Network Based Media Processing (NBMP), the method being performed by at least one processor, and the method comprising:
obtaining a first request from an NBMP client to an NBMP workflow manager;
transmitting a first response from the NBMP workflow manager to the NBMP client, the first response being in response to and based on the first request;
obtaining a second request from the NBMP client to the NBMP workflow manager, the second request being in response to and based on the first response;
controlling the NBMP workflow manager to set a plurality of parameters of a NBMP workflow in response to and based on the second request, the parameters comprising a parameter "loop" enabling looping around a defined schedule, a parameter "status", indicating types of the first request, the first response, and the second request, and at least one of a parameter "duration", representing a schedule table comprising rows in order of execution of tasks or task groups, and a "segment" parameter indicating task execution task by task for a fixed number of segments; and
controlling a media content to be processed using the NBMP workflow and at least one parameter of the plurality of parameters,
wherein the first request and the second request each request capabilities from the NBMP workflow manager, the capabilities being scheduling capabilities other than of functions of tasks of processing the NBMP workflow, and
wherein the NBMP workflow is, when the first request is obtained, a running workflow.

2. The method according to claim 1, wherein
the first request instructs the NBMP workflow manager to respond to the NBMP client with the capabilities from the NBMP workflow manager,
the second request instructs the NBMP workflow manager to set the at least one parameter of the NBMP workflow, the at least one parameter being of the capabilities from the NBMP workflow manager and other than of functions of tasks of processing the NBMP workflow.

3. The method according to claim 2, further comprising, before obtaining the first request and transmitting the first response, obtaining, by the NBMP workflow manager, an initial request from the NBMP client and transmitting, by the NBMP workflow manager, an initial response to the NBMP client,
wherein the initial request requests different scheduling capabilities than does the first request,
wherein the first request is transmitted from the NBMP client to the NBMP workflow manager in response to the NBMP client receiving the initial response,
wherein the first request requests the scheduling capabilities, as the capabilities, of the NBMP workflow manager, and
wherein the second request instructs the NBMP workflow manager to set the at least one parameter based on the scheduling capabilities.

4. The method according to claim 3, further comprising:
transmitting a second response from the NBMP workflow manager to the NBMP client, wherein
the second request instructs the NBMP workflow manager to set a specific schedule for the running workflow, and
the second response indicates to the NBMP client whether the specific schedule was set in response to the second request.

5. The method according to claim 2, wherein
the at least one parameter defines whether scheduling of the NBMP workflow is based on any of units of duration and units of segments.

6. The method according to claim 2, further comprising
obtaining a third request from the NBMP client to the NBMP workflow manager, the third request requests scaling capabilities of the NBMP workflow manager; and
obtaining a fourth request from the NBMP client to the NBMP workflow manager, hethe fourth request instructs the NBMP workflow manager to set a scaling parameter based on the scaling capabilities.

7. The method according to claim 6, further comprising:
transmitting a third response from the NBMP workflow manager to the NBMP client, wherein
the third response indicates to the NBMP client whether a specific scaling was set in response to the fourth request.

8. The method according to claim 7, wherein
the running workflow comprises a workflow descriptor (WD) indicating a workflow descriptor document (WDD), and
controlling the NBMP workflow manager to set the at least one parameter of the NBMP workflow in response to and based on the second request comprises adding a descriptor to the WDD during an UpdateWorkflow operation and based on the at least one parameter.

9. The method according to claim 8, wherein
the second response comprises returning an updated WDD to the NBMP client based on adding the descriptor to the WDD.

10. The method according to claim 2, wherein
the at least one parameter defines scaling by any of upgrading a media processing entity and adding parallel tasks to existing tasks of the running workflow.

11. An apparatus for processing a media content in Moving Picture Experts Group (MPEG) Network Based Media Processing (NBMP), the apparatus comprising:
at least one memory configured to store computer program code;
at least one processor configured to access the computer program code and operate as instructed by the computer program code, the computer program code including:
first obtaining code configured to cause the at least one processor to obtain a first request from an NBMP client to an NBMP workflow manager;
transmitting code configured to cause the at least one processor to transmit a first response from the NBMP workflow manager to the NBMP client, the first response being in response to and based on the first request;
second obtaining code configured to cause the at least one processor to obtain a second request from the NBMP client to the NBMP workflow manager, the second request being in response to and based on the first response;
first controlling code configured to cause the at least one processor to control the NBMP workflow manager to a plurality of parameters of a NBMP workflow in response to and based on the second request, the parameters comprising a parameter "loop" enabling looping around a defined schedule, a parameter "status", indicating types of the first request, the first response, and the second request, and at least one of a parameter "duration", representing a schedule table comprising rows in order of execution of tasks or task groups, and a "segment" parameter indicating task execution task by task for a fixed number of segments; and second controlling code configured to cause the at least one processor to control a media content to be processed using the NBMP workflow and at least one parameter of the plurality of parameters, wherein the first request and the second request each request capabilities from the NBMP workflow manager, the capabilities being scheduling capabilities other than of functions of tasks of processing the NBMP workflow, and wherein the NBMP workflow is, when the first request is obtained, a running workflow.

12. The apparatus according to claim 11, wherein the first request instructs the NBMP workflow manager to respond to the NBMP client with the capabilities from the NBMP workflow manager, and the second request instructs the NBMP workflow manager to set the at least one parameter of the NBMP workflow, the at least one parameter being of the capabilities from the NBMP workflow manager and other than of functions of tasks of processing the NBMP workflow.

13. The apparatus according to claim 12, wherein the first request requests the scheduling capabilities, as the capabilities, of the NBMP workflow manager, and the second request instructs the NBMP workflow manager to set the at least one parameter based on the scheduling capabilities.

14. The apparatus according to claim 13, further comprising:

second transmitting code configured to cause the at least one processor to transmit a second response from the NBMP workflow manager to the NBMP client, wherein the second request instructs the NBMP workflow manager to set a specific schedule for the running workflow, and the second response indicates to the NBMP client whether the specific schedule was set in response to the second request.

15. The apparatus according to claim 12, wherein the at least one parameter defines whether scheduling of the NBMP workflow is based on any of units of duration and units of segments.

16. The apparatus according to claim 12, wherein the NBMP workflow manager is configured to receive and respond to requests for scaling capabilities from the NBMP client.

17. The apparatus according to claim 16, further comprising:

second transmitting code configured to cause the at least one processor to transmit a second response from the NBMP workflow manager to the NBMP client, wherein the second response indicates to the NBMP client whether a specific scaling was set.

18. The apparatus according to claim 17, wherein the running workflow comprises a workflow descriptor (WD) indicating a workflow descriptor document (WDD), and controlling the NBMP workflow manager to set the at least one parameter of the NBMP workflow in response to and based on the second request comprises adding a descriptor to the WDD during an UpdateWorkflow operation and based on the at least one parameter.

19. The apparatus according to claim 18, wherein the second response comprises returning an updated WDD to the NBMP client based on adding the descriptor to the WDD.

20. A non-transitory computer readable medium storing a program causing a computer to execute a process for processing a media content in Moving Picture Experts Group (MPEG) Network Based Media Processing (NBMP), the method being performed by at least one processor, and the method comprising, the process comprising:

obtaining a first request from an NBMP client to an NBMP workflow manager;

transmitting a first response from the NBMP workflow manager to the NBMP client, the first response being in response to and based on the first request;

obtaining a second request from the NBMP client to the NBMP workflow manager, the second request being in response to and based on the first response;

controlling the NBMP workflow manager to set a plurality of parameters of a NBMP workflow in response to and based on the second request, the parameters comprising a parameter "loop" enabling looping around a defined schedule, a parameter "status", indicating types of the first request, the first response, and the second request, and at least one of a parameter "duration", representing a schedule table comprising rows in order of execution of tasks or task groups, and a "segment" parameter indicating task execution task by task for a fixed number of segments; and controlling a media content to be processed using the NBMP workflow, wherein the first request and the second request each request capabilities from the NBMP workflow manager, the capabilities being scheduling capabilities other than of functions of tasks of processing the NBMP workflow, and wherein the NBMP workflow is, at least at a time of the first request, a running workflow.

* * * * *